United States Patent [19]

Sylogye

[11] 4,181,095
[45] Jan. 1, 1980

[54] SCREEN ASSEMBLY FOR ANIMAL LITTER STATION

[76] Inventor: Michael Sylogye, 429 Roscoe, Chicago, Ill. 60657

[21] Appl. No.: 870,252

[22] Filed: Jan. 18, 1978

[51] Int. Cl.² ............................................. A01K 29/00
[52] U.S. Cl. ........................................ 119/1; 119/19; 52/71
[58] Field of Search .......................... 119/1, 19; 52/71

[56] References Cited

U.S. PATENT DOCUMENTS

| | | | |
|---|---|---|---|
| 2,375,941 | 5/1945 | Nostrand | 52/71 |
| 2,765,498 | 10/1956 | Kelnhofer | 52/71 X |
| 4,029,048 | 6/1977 | Gershbein | 119/1 |

Primary Examiner—Hugh R. Chamblee

[57] ABSTRACT

There is disclosed a collapsible screen assembly for use in connection with enclosing and encircling an animal litter station formed by opposed sidewalls, a back wall and having an open front portion, and further including a removably engageable top wall, each of the opposed sidewalls being formed by a series of three sidewall panels, each being reversely hinge mounted to the next adjacent panel, the back wall being formed by a series of two back wall panels, each of the back wall panels being hingedly secured with one of the opposed sidewall panels thereby to accommodate only an interior hinge movement with respect to the back wall panel, and the top wall being formed by a series of three top wall panels wherein the first and third panels are reversely hinged mounted to the middle panel such that the opposed sidewalls may be reversely folded one panel with respect to the next with all panels being foldable against the two back wall panels which are in turn exteriorally hinge mounted together, and the top wall being foldable to a compact arrangement once removed from the screen assembly such that the entire screen assembly may be easily and compactly stored when not in use, and unfolded to form a surrounding screen assembly for an animal litter station.

10 Claims, 7 Drawing Figures

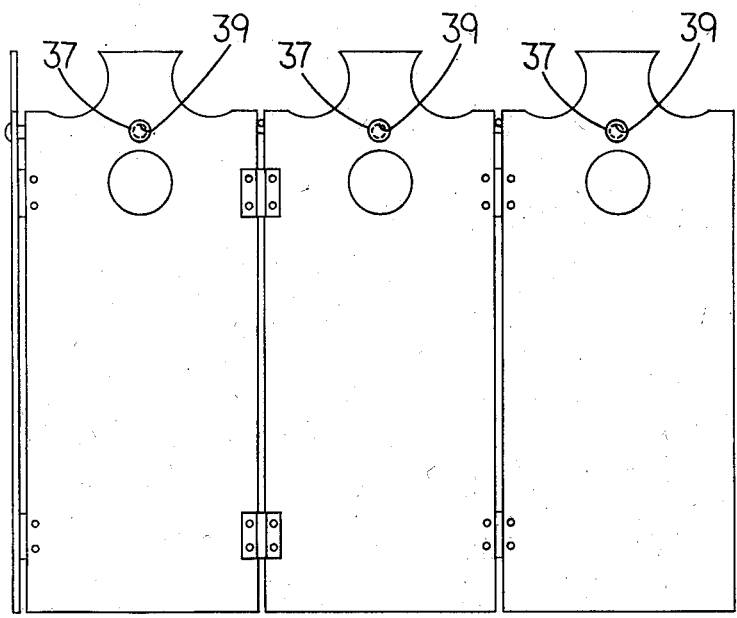
FIG. 4
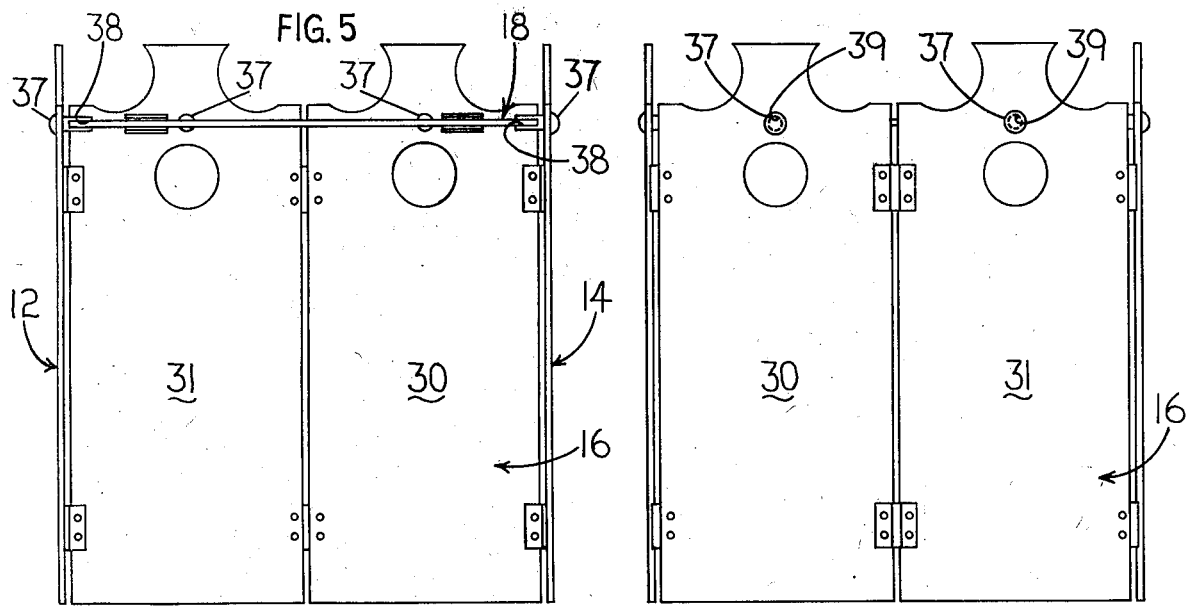
FIG. 5
FIG. 6
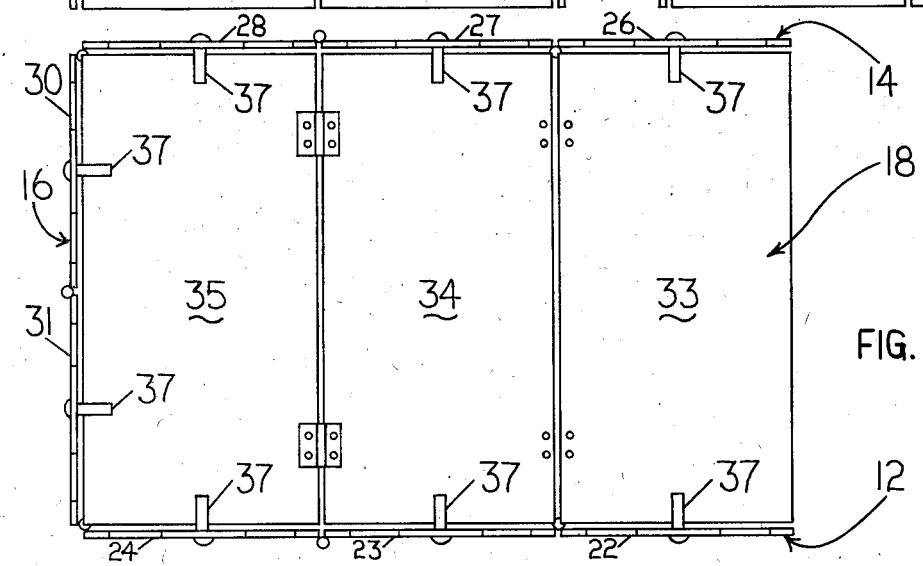
FIG. 7

SCREEN ASSEMBLY FOR ANIMAL LITTER STATION

BACKGROUND OF THE INVENTION

It has become increasingly popular for home or apartment dwellers to have pet animals such as dogs and cats living in the same dwelling as the occupants. Hence, there has developed a need for improved sanitary stations for such animals which are easily usable by the animals, but nevertheless, permits the occupants to easily and efficiently remove the waste materials deposited by the animal in the sanitary station. It has been further noted that such sanitary stations have assumed fairly large proportions in order to accommodate larger size animals which are maintained by occupants as household pets. It has further been found that the sanitary stations, per se, are relatively unattractive, but nevertheless, must be maintained in a prominently accessible place for the animal's use.

In resolving the above noted problem, a variety of devices have been proposed as enclosures for such animal litter stations, and the patented art has demonstrated various attempts at resolving this problem. For example, U.S. Pat. No. 3,085,550 shows a cat sanitary container enclosure which basically comprises a four sided box arrangement having an open bottom portion in order to accommodate the litter station thereunder, and an open front portion to permit access thereto by the animal. However, it will be noted that the subject enclosure is basically a formed enclosure and hence, is not collapsible in any sense. Therefore, the closure cannot be conveniently stored, but rather must be left intact at all times. This same problem is true with most of the other enclosures shown in the art. For example, U.S. Pat. No. 3,482,546 shows another form of a sanitary litter box for pets such as cats and the like, wherein the enclosure is, again, a rectangularly shaped box structure having an open front end. There is no way that the closure shown in the U.S. Pat. No. 3,482,546 can be collapsed for convenience in storage and hence, must remain as is in all usages of the device. Once again, the same problem is evident with respect to the structure shown in U.S. Pat. No. 3,793,989 wherein there is shown a deodorized pet relief station including an enclosure which encircles the litter station. The enclosure is substantially barn-shaped but clearly is not collapsible in any respect and hence, cannot be conveniently stored.

Another aspect to the enclosure shown for pet relief stations as identified above is the fact that none of these enclosures are particularly esthetically pleasing and hence, do not blend with the occupant's furnishings in any manner which would permit their use in virtually any room of the house. In attempting to resolve this type of problem, others have developed litter stations which are enclosed and made to simulate a piece of furniture. For example, the device shown in U.S. Pat. No. 3,872,832 gives the general appearance of a cabinet arrangement wherein the cabinet includes an open side portion in order to permit access thereto by the animal. It is clear that the subject enclosure is intended as a permanent piece of furniture and hence, is not intended to be of a knock-down construction or easily collapsible for storage purposes.

Various other similar attempts have been made in the art to develop convenient pet litter stations and enclosures therefor, however to date, no solution has existed wherein the enclosure for the litter station is totally collapsible in order to permit ease of storage.

OBJECTS AND ADVANTAGES

It is therefore the principal object of the present invention to provide an improved enclosure for a pet litter station which is easily collapsible in order to permit ease of storage, while nevertheless, permitting ease of installation while maintaining esthetically pleasing characteristics.

In conjunction with the foregoing object, it is yet a further object of the invention to provide an enclosure for a pet litter station wherein the enclosure consists of a collapsible screen assembly for enclosing the litter station formed by opposed sidewalls, a back wall and having an open front portion, each of the opposed sidewalls being formed by a plurality of sidewall panels, each of the sidewall panels being reversely hinge-mounted to the next adjacent wall panel, the back wall being formed by a pair of back wall panels having one of each of the plurality of opposed sidewall panels hingedly secured thereto, the hinge securement permitting each of the opposed sidewall panels to travel only interiorally with respect to the back wall panel, and a top wall which is removably engaged to the opposed sidewall panels and the back wall panel by engagement means such that the top wall is removably engaged with each of the opposed sidewall panels and with the back wall panel thereby to provide rigidity and stability when in use, while nevertheless ease of disengagement in order to permit the collapsing of the screen assembly for storage purposes.

In conjunction with the foregoing object, it is yet a further object to provide a screen assembly functioning as an enclosure for a pet litter station of the type described wherein the opposed sidewalls are formed by a series of three sidewall panels, each of the three sidewall panels being reversely hinge-mounted with respect to the next adjacent panel, and wherein the back wall panels are interiorally hinge-mounted to one of the opposed sidewall panels such that the entire enclosure may be reverse folded one panel with respect to the next in order to form a compact storage posture when not in use.

Still a further object of the invention is to provide a screen assembly of the type described above for use as an enclosure for an animal litter station wherein the top wall is formed by a series of three top wall panels wherein the first and third panels are reversely hinge-mounted to the middle panel such that the top wall may be easily removable disengaged from the opposed sidewalls and back wall, and reverse folded to provide a compact storage posture.

Yet another object of the invention is to provide a screen assembly for use as an enclosure for an animal litter station of the type described wherein the engagement means for engaging the top wall panels to the opposed sidewall panels and backwall panels is formed by friction bolts, the friction bolts being inserted through a corresponding sidewall panel and back wall panel into the top wall panel thereby to permit ease of removal without the need for any extraneous tools and the like.

Yet a further object of the present invention is to provide a screen assembly of the type described wherein each of the sidewall panels and back wall panels are provided with aeration apertures in order to permit the enclosed litter station aeration pathways when in use.

Further objects of the invention pertain to the particular arrangement of the elements and parts whereby the above-outlined additional operating features thereof are attained.

The invention, both as to its organization and method of operation, together with further objects and advantages thereof, will best be understood by reference to the following specification, taken in conjunction with the accompanying drawings.

BRIEF DESCRIPTION OF DRAWINGS

The accompanying drawings may conveniently be described as follows:

FIG. 4 is a side elevational view of an opposed sidewall assembly formed by three sidewall panels and further showing the manner in which the same are interiorally hinge mounted to the back wall panel;

FIG. 5 is a front elevational view showing the open front end and a view of the interior portion of the back wall;

FIG. 6 is a back elevational view showing the hinge mounting of the back panels and the manner in which the back wall assembly is hingedly mounted to the opposed sidewall members; and FIG. 7 is a top plan view showing the opposed sidewall panels, back wall panels, and the top wall in position in the engagement means whereby the top wall is held in position with respect to the remaining portion of the assembly.

SUMMARY OF THE INVENTION

In summary, the present invention provides an improved enclosure for use on an animal litter station which permits the enclosure to be fully collapsible for storage purposes, while at the same time, providing an esthetically pleasing structure thereby to be useful in any room of the occupant's house. The enclosure is formed by a screen assembly which in turn is formed by a plurality of panel members which are reversely hinge mounted one with respect to the next such that the entire assembly may be compactly folded into a flat stack, including the top wall panels, for storage purposes.

DETAILED DESCRIPTION OF THE INVENTION

Figure 1:
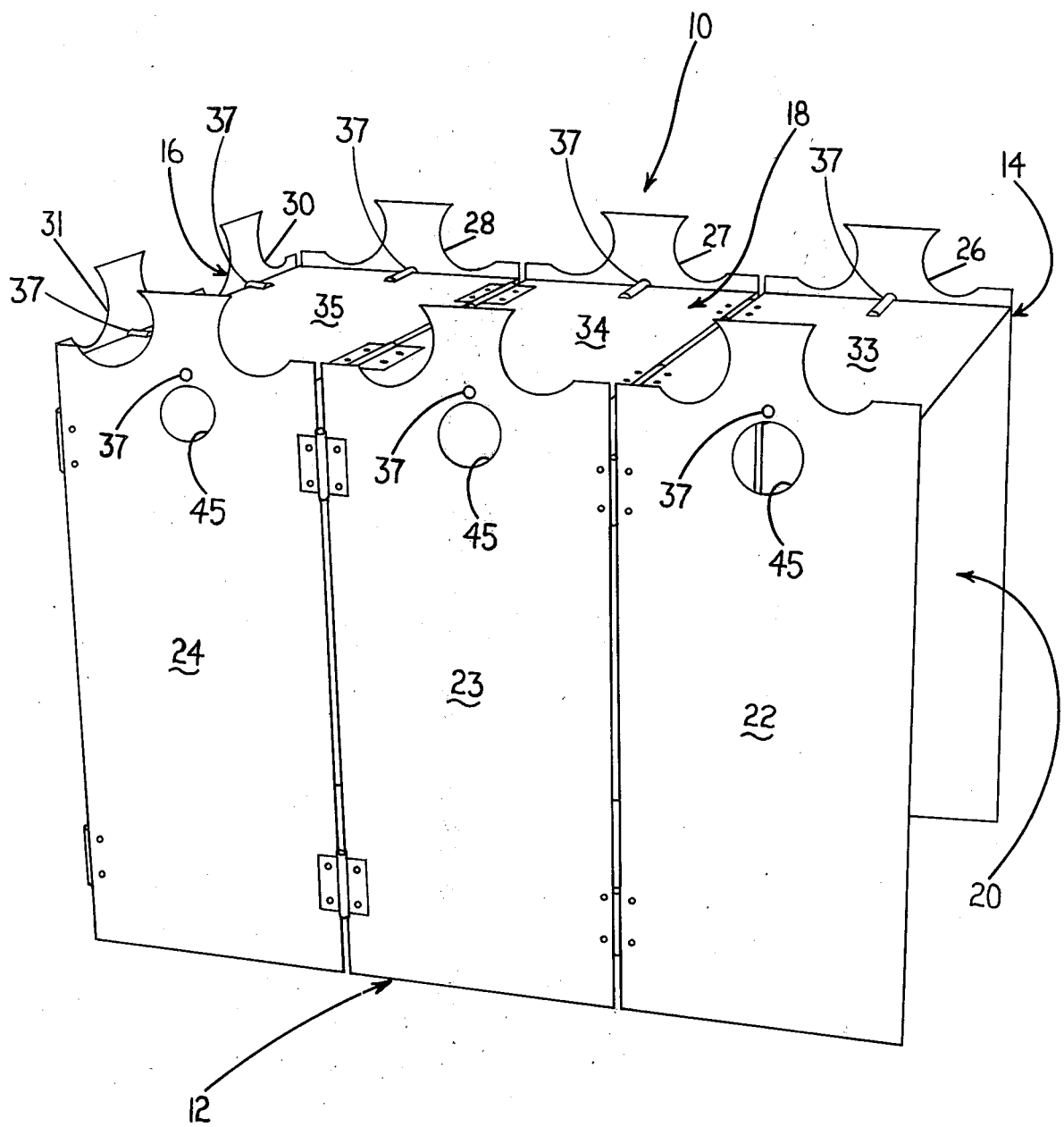
FIG. 1 is a perspective view showing the screen assembly of the present invention.

As shown in FIG. 1, the screen assembly, generally denoted by the numeral 10, is illustrated. It will be noted that the screen assembly 10 is formed by opposed sidewalls 12 and 14 respectively, and a back wall 16. The screen assembly 10 is enclosed by a top wall 18 and is shown to have an open front portion generally denoted by the numeral 20.

It will be noted that the opposed sidewall 12 is formed by a series of three sidewall panels 22, 23, and 24 respectively, and similarly, enclosed sidewall 14 is shown to be formed of a series of three sidewall panels 26, 27 and 28 respectively. The back wall is formed of a series of two back wall panels 30 and 31 respectively, and the top wall 18 is similarly formed of a series of three top wall panels 33, 34, and 35 respectively.

As shown in FIGS. 1 and 7 of the drawings, the top wall assembly 18 is shown to be held in position by means of a series of friction bolts 37 which are simply inserted through corresponding engagement apertures 39 provided in the opposed sidewalls 12 and 14 respectively, and back wall 16. As will be noted from a view of FIGS. 1 and 7, each of the top wall panels 33, 34 and 35 forming the top wall 18 are held in position with corresponding opposed sidewalls 22-26, 23-27 and 24-28, by means of friction bolts 37, and are similarly held in position in the two back wall panels 30 and 31 of the back wall 16 by friction bolts 37. Hence the top wall 18 provides rigidity and stability for the entire screen assembly 10 when installed in position.

As shown in FIG. 5 of the drawings, the friction bolts 37 may be formed as split bolts which include an open slot generally represented by the numeral 38 which is dimensionally sized to accommodate the thickness of the corresponding top wall panels 33, 34 and 35 therein. It will be appreciated, however, that the top wall panels 33, 34 and 35 may be provided with apertures, and a friction bolt simply inserted into the apertures so provided in order to rigidify the top wall 18 in position.

Figure 2:
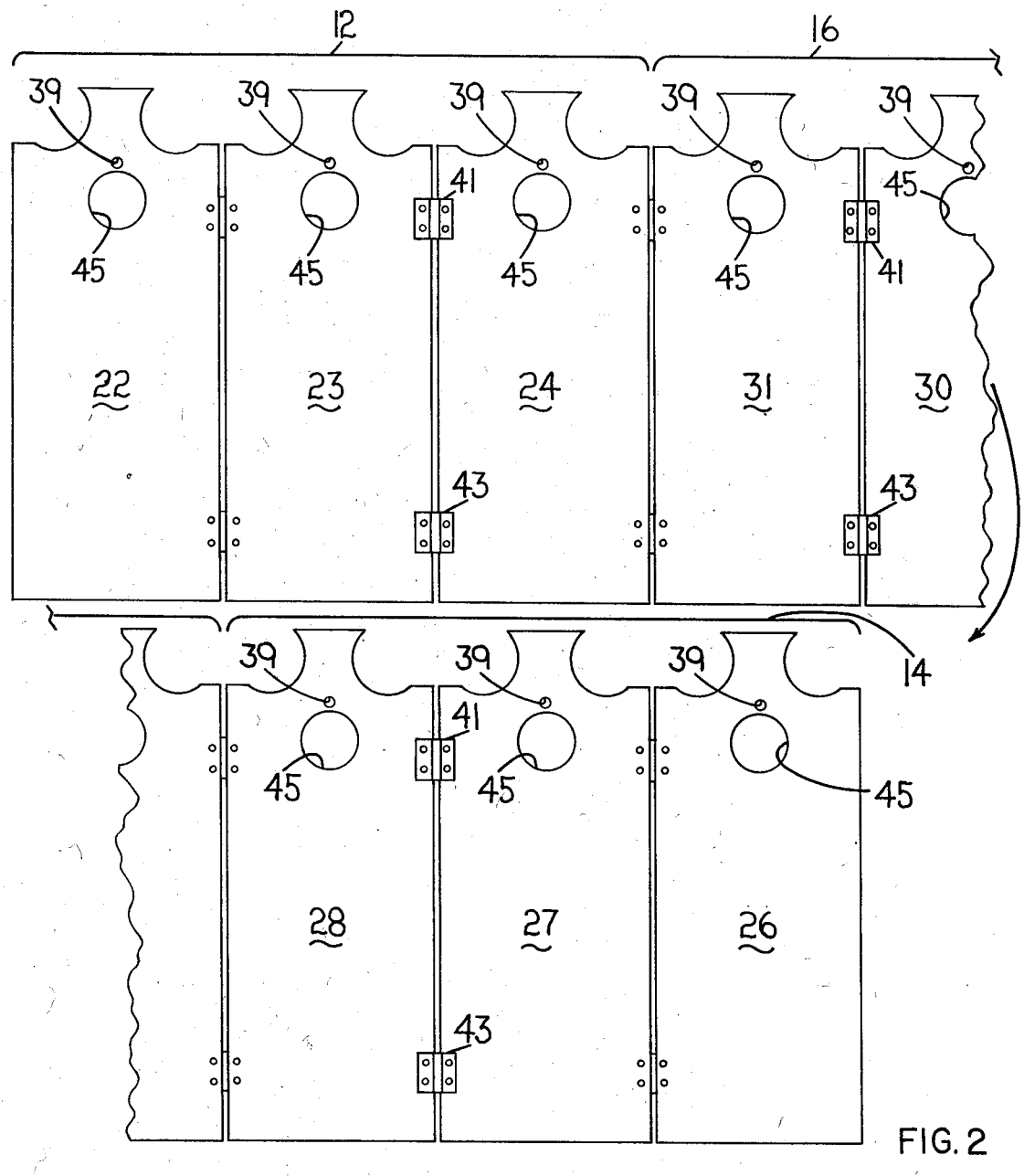
FIG. 2 is a side elevational, serial view, showing the opposed sidewalls and back wall when hingedly moved into a straight horizontal configuration.
Figure 3:
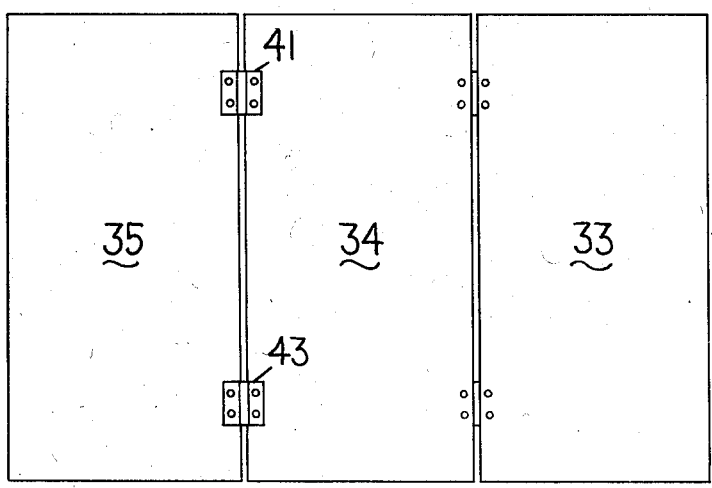
FIG. 3 is a side elevational view of a series of a three panel sidewall showing the manner in which each of the panels is reversely hinge mounted to the next adjacent panel.

As shown in the drawings, the panels forming the opposed sidewalls 12 and 14, as well as the back wall 16 are reversely hinge mounted one to the next adjacent panel such that the entire panel assembly including the opposed sidewalls 12 and 14 and the back wall 16 may be reversely folded into a stacked arrangement. As shown in FIG 2, opposed sidewalls 12 and 14 and the backwall 16 may be unfolded into a completely linear horizontal arrangement and then, by reversely folding the panels one with respect to the next, stacked orientation is achieved. The reversely hinge-mounted arrangement is achieved by alternately arranging the hinges on the basis of an inside/outside mounting. With specific reference to FIG. 2, it will be observed that the hinge mounting of sidewall panels 26 and 27 is such that those two panels will be folded through an outside fold with reference to their planar view as illustrated therein. The hinge mounting of panels 27 and 28 is such that panel 27 will fold over and on top of panel 28 with reference to the planar view of FIG. 2. Hence, panels 26, 27, and 28 will be conveniently folded into a three tiered stack. The folding pattern as indicated is repeated with alternate hinge mountings through panels 30, 31, 24, 23 and 22 such that when all eight panels are fully folded, a single stack arrangement of the panels is achieved. The same alternate hinge arrangement is provided in connection with the top wall 18, since panel 33 will fold exteriorly with respect to panel 34, while panel 35 will fold interiorly with respect to panel 34. Hence, a three tiered stacking arrangement will be achieved with regard to the top wall 18.

It will therefore be apparent that each pair of hinges 41 and 43 is alternately mounted with an inside/outside mounting arrangement with respect to each panel compared to the next adjacent panel such that an exterior/interior folding arrangement will be achieved. In this manner, the entire screen assembly 10 may be conveniently unfolded and arranged as a three sided housing leaving the fourth end as an open front end 20, such that the pet animal will have access to the litter station enclosed by the screen assembly 10. The top wall 18 is conveniently inserted into place by simply positioning the same between the opposed sidewalls 12 and 14 and against the back wall 16, and then inserting friction bolts 37 through the appropriate apertures 39 provided until the bolts 37 contact and engage the top wall 18.

It will also be apparent from a view of the various figures that the assembly 10 may further be provided with appropriate aeration apertures generally denoted by the numeral 45 (FIG. 2). As shown in the embodiment depicted in the drawings, an aeration aperture is provided in each of the opposed sidewall panels and back wall panels such that good air circulation will be provided.

Another feature of the screen assembly 10 as shown in the preferred embodiment depicted herein is that each of the exterior surfaces of the sidewall panels and back wall panels present a smooth surface which is ideal for accommodating the various designs for ornamentation purposes. Hence, it is contemplated that the assembly may be sold to the public as a plain surface arrangement, and the ultimate purchaser may apply whatever decor meets the decorating means of the dwelling in which the screen assembly tends to be positioned. In this manner, the screen assembly 10 of the present invention may be incorporated in any room of the dwelling and appropriately decorated to color coordinate therewith. Furthermore, when not in use, the entire screen assembly 10 may be disconnected and fully collapsed for storage purposes, and it is intended that storage may be achieved in any storage closet or like place. It is therefore believed that the screen assembly 10 of the present invention which functions as an enclosure for an animal litter station incorporates a great deal of versatility in terms of decor, storage capability, and convenience, while still fully functioning as a full enclosure for the animal litter station.

From the above description, it will be appreciated that all of the above-noted objects and advantages of the present invention have been provided in that a fully collapsible screen assembly has been developed to function as an enclosure for an animal litter station. Hence, while there has been described what is at present considered to be the preferred embodiment of the invention, it will be understood that various modifications may be made therein and it is intended to cover in the appended claims all such modifications as fall under the true spirit and scope of the invention.

What is claimed is:

1. A collapsible screen assembly for encircling and enclosing an animal litter station, comprising in combination,
    a screen assembly formed by opposed sidewalls, a backwall and having an open front portion,
    each of said opposed sidewalls being formed by a plurality of sidewall panels,
    each of said sidewall panels being reversely hinge-mounted to the next adjacent wall panel,
    said backwall being formed by a back wall panel having one of each of said plurality of opposed sidewall panels hingedly secured thereto,
    said hinged securement permitting each of said opposed sidewall panels to travel only interiorally with respect to said backwall panel,
    and a top wall removably engaged to said opposed sidewall panels and said backwall panel by engagement means such that said top wall is removably engaged with each of said plurality of opposed sidewall panels and with said back wall panel thereby to provide rigidity and stability of said screen assembly when in use,
    whereby said screen assembly may be unfolded to provide a substantially total enclosure for an animal litter station while still permitting access thereto by the animal through said open front portion, and allowing said screen assembly to be completely folded into a compact storage posture by reverse folding of said opposed sidewall panels one with respect to the next adjacent panel, and interiorally folding said stack of opposed sidewall panels with respect to said back wall panel.

2. The screen assembly as set forth in claim 1 above, wherein said back wall panel is formed by a series of two back wall panels hingedly secured together and wherein each of said backwall panels is hingedly secured with one of said opposed sidewall panels being hingedly secured thereto such as to accommodate only an interior hinge movement with respect to said back wall panel.

3. A screen assembly as set forth in claim 2 above, wherein said screen assembly includes opposed sidewalls wherein each of said opposed sidewalls is formed by a series of three sidewall panels, each of said three sidewall panels being reversely hinge-mounted with respect to the next adjacent panel.

4. A screen assembly as set forth in claim 3 above wherein said top wall is formed by a series of three top wall panels, wherein said first and third panels are reversely hinge-mounted to said middle panel, whereby said top wall may be removably disengaged from said screen assembly and reverse folded to provide a compact storage posture.

5. A screen assembly as set forth in claim 4 above, wherein said engagement means comprises a friction bolt, each of said top wall panels including a pair of opposed friction bolts thereby to secure and engage said top wall to each of said opposed sidewall panels.

6. A screen assembly as set forth in claim 5 above, wherein said screen assembly further includes two friction bolts thereby to secure said top wall to said back wall panels.

7. A screen assembly as set forth in claim 6 above, wherein each of said back wall panels is provided with a friction bolt thereby to secure each of said two back wall panels to said corresponding top wall panel.

8. The screen assembly as set forth in claim 1 above wherein said screen assembly is further provided with opposed sidewalls wherein each of said sidewalls is provided with at least one aeration aperture disposed therein.

9. A screen assembly as set forth in claim 8 above, wherein each of said sidewall panels is provided with a single aeration aperture such that a total of six aeration apertures are provided in said screen assembly.

10. The screen assembly as set forth in claim 9 above wherein said screen assembly further includes a series of two back wall panels forming said back wall wherein each of said back wall panels is provided with an aeration aperture disposed therein, such that a total of eight aeration apertures are provided in said screen assembly.

* * * * *